(12) United States Patent
Sloss

(10) Patent No.: US 7,898,902 B2
(45) Date of Patent: Mar. 1, 2011

(54) METHOD OF REPRESENTATION OF SONAR IMAGES

(75) Inventor: Martyn Sloss, Fife (GB)

(73) Assignee: Codaoctopus Group, Jersey City, NJ (US)

( * ) Notice: Subject to any disclaimer, the term of this patent is extended or adjusted under 35 U.S.C. 154(b) by 0 days.

(21) Appl. No.: 12/138,702

(22) Filed: Jun. 13, 2008

(65) Prior Publication Data

US 2009/0310438 A1    Dec. 17, 2009

(51) Int. Cl.
*G03B 42/06* (2006.01)
(52) U.S. Cl. .............................................. 367/7
(58) Field of Classification Search ............... 367/7, 11, 367/8, 107, 88; 348/163; 600/443; 73/606; 382/199
See application file for complete search history.

(56) References Cited

U.S. PATENT DOCUMENTS

| | | | | |
|---|---|---|---|---|
| 5,184,330 | A * | 2/1993 | Adams et al. | 367/88 |
| 6,438,071 | B1 * | 8/2002 | Hansen et al. | 367/88 |
| 7,466,628 | B2 * | 12/2008 | Hansen | 367/11 |
| 7,489,592 | B2 * | 2/2009 | Hansen | 367/96 |
| 2005/0007882 | A1 * | 1/2005 | Bachelor et al. | 367/103 |
| 2008/0043572 | A1 * | 2/2008 | Hansen | 367/11 |
| 2008/0130413 | A1 * | 6/2008 | Bachelor et al. | 367/103 |
| 2008/0198694 | A1 * | 8/2008 | Hansen | 367/96 |

* cited by examiner

*Primary Examiner* — Dan Pihulic
(74) *Attorney, Agent, or Firm* — Rodney T Hodgson

(57) ABSTRACT

Sonar three dimensional data are represented by a two dimensional image. Pixels of the two dimensional image are emphasized if the if the three dimensional data associated with the pixel differ by more than a criterion from the three dimensional data associated with neighboring pixels.

19 Claims, 5 Drawing Sheets

METHOD OF REPRESENTATION OF SONAR IMAGES

RELATED PATENTS AND APPLICATIONS

U.S. Pat. No. 6,438,071, issued to Hansen, et al. on Aug. 20, 2002, and entitled "Method for producing a 3D image"; U.S. Pat. No. 7,466,628, issued to Hansen on Dec. 16, 2008; U.S. Pat. No. 7,489,592, issued to Hansen on Feb. 10, 2009; U.S. Patent Publication 20080302115 by Eknes; Erik; et al. filed 8, Jun. 2007 and published Dec. 11, 2008; and U.S. patent application Ser. No. 12/103,839 filed 16, Apr. 2008 are related to the present application. The above identified patents, patent publications, and patent applications are assigned to the assignee of the present invention and are incorporated herein by reference in their entirety including incorporated material.

BACKGROUND OF THE INVENTION

1. Field of the Invention

The field of the invention is the field of imaging of sonar data

2. Objects of the Invention

It is an object of the invention to produce a method of treating data returned from a sonar imaging system that improves the visual representation of the sonar data.

SUMMARY OF THE INVENTION

Three dimensional data from a sonar imaging system are represented as pixels in a two dimensional image. If a change in a particular characteristic of the three dimensional data satisfies a criterion, a pixel associated with the particular characteristic is emphasized.

DETAILED DESCRIPTION OF THE INVENTION

Figure 1:
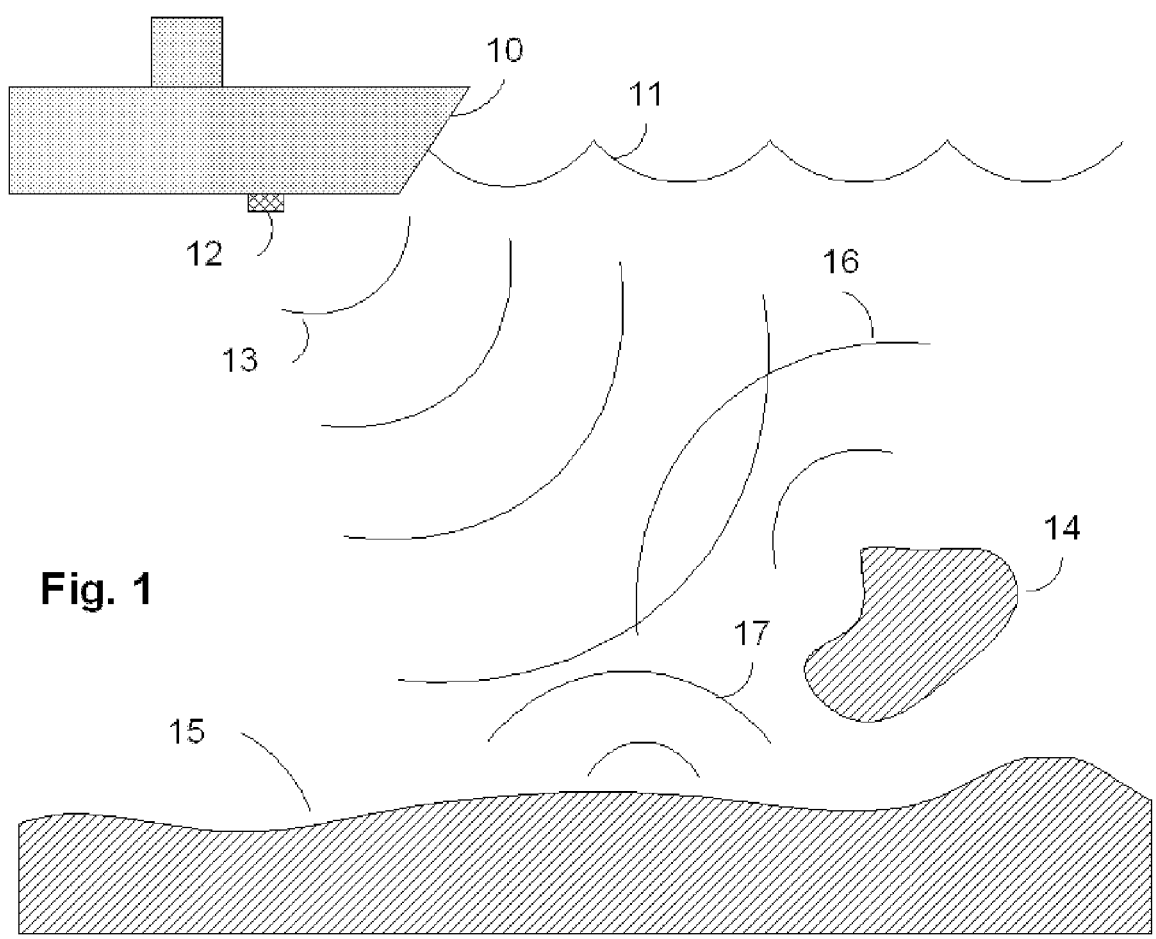
FIG. 1 shows a sketch of a typical use of the method of the invention.

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be impossible for even the best and fastest computers to pick out. Much effort has thus been spent in turning data into images.

In particular, images which are generated from data which are not related to light are difficult to produce. One such type of data is sonar data, wherein a sonar signal is sent out from a generator into a volume of fluid, and the reflected sound energy from objects in the ensonified volume is recorded by a multielement detector. The term "ensonified volume" is known to one of skill in the art and is defined herein as being a volume of fluid through which sound waves are directed.

The sonar data from such multielement detectors is generally recorded as points in three dimensional space as a function of range and of two orthogonal angles. These data in polar coordinate space are in turn generally reduced and presented as data from a three dimensional Cartesian coordinate space. The data may then be presented as height above the sea bed, for example, or depth below the surface, as a "z" coordinate, while the x and y coordinates could be chosen as west and north, for example. In other examples, the x or y coordinate could be chosen to be parallel to a wall or other long, mostly straight object.

One characteristic of sonar data is that it is very sparse, as the ensonified volume is generally water having only one or a few objects of interest. The volume of the fluid is generally divided into a series of cubes, and data is returned from a small percentage of the cubes. The resolution of the sonar is proportional to the linear dimension of the cubes, while the computation cost of recording the signal from each detector element and calculating from whence the signals have come is inversely proportional to the cube dimensions to the third power. There is then a tradeoff between resolution and computer power and time taken to produce an image from received data.

In other imaging technologies, the data are very dense. In an art unrelated to sonar imaging, medical imaging essentially has signals from each voxel, and the techniques for such imaging as CT scans, MRI scans, PET scans, and Ultrasound Imaging is not applicable to the sparse sonar data. In the same way, signals from sound waves sent out from the earths surface into the depths to return data of rock formations in the search for oil produce dense data, and techniques developed for such fields would not in general be known or used by one of skill in the art of sonar imaging.

The present invention is used to treat the sparse data from sonar imaging equipment to produce images which would be comparable to an optical image of a submerged object, if the object could in fact be seen through turbid water or other fluid.

FIG. 1 shows a typical sonar imaging system where a vessel 10 floats on the surface 11 of the sea. A sound navigation and ranging (SONAR) receiver 12 is attached to the bottom of the vessel, or alternatively may be strung by a cable from the vessel, or alternatively may be in a remotely operated vehicle (ROV) which sends data to the vessel. The vessel may be a surface vessel as shown, a submarine, or an independently operating ROV.

A single sonar pulse is shown as a wave front 13 propagating from a sonar transmitter 12 attached to a vessel 10. Typically, the pulse would be very short, and the sound energy would be concentrated in a narrow region around the outgoing line shown as a front 13. The sonar pulse could spread out very broadly, as shown, or could be concentrated as a directed beam by suitable use of multiple phased sonar transmitters.

FIG. 1 shows an object 14 suspended above the seabed 15. Sound waves 16 and 17 are shown schematically reflected from surfaces of the object and the seabed. The reflected sound waves are received at the sonar receiver 12. If the receiver 12 is a multielement receiver, the direction from which reflected waves come and the range of the object or the seabed can be calculated. In effect, each element of the multielement receiver measures the pressure versus time of the sound waves impinging on the detector. The phase and intensity of the various beating waves can be measured much as the phase and intensity of electromagnetic waves can be measured in an optical interferometer. The resulting pattern gives, in effect, a hologram which describes the three dimensional positions of the objects scattering the known sound waves. Thus, the origin of each received signal can be traced to a point in the three dimensional volume. The points of origin, intensities of signal, etc are recorded and analyzed by computer to give image data describing the objects in the three dimensional volume. For typical sonar data, no signal is recorded as originating from most points in the volume, and the data are very sparse. In general, data are presented by presenting the range from which either the maximum signal (MAX) is received or the first above a threshold (FAT) signal is received. The single number for the range is normally presented as a function of two polar angles, and such presentation requires the fewest computer calculations on the recorded data. Note that the recorded data contains much more information than a mere single range vs two angle image.

Note that the sent out sonar pulse 13 can be generated using a sonar pulse generator which is either combined with, near to, or separated from the receiver 12. In particular, a sonar pulse generator may be in a remotely operated vehicle (ROV), in a fixed position with respect to the seabed, or in any other fixed or movable position with respect to the sonar receiver 12.

Figure 2:
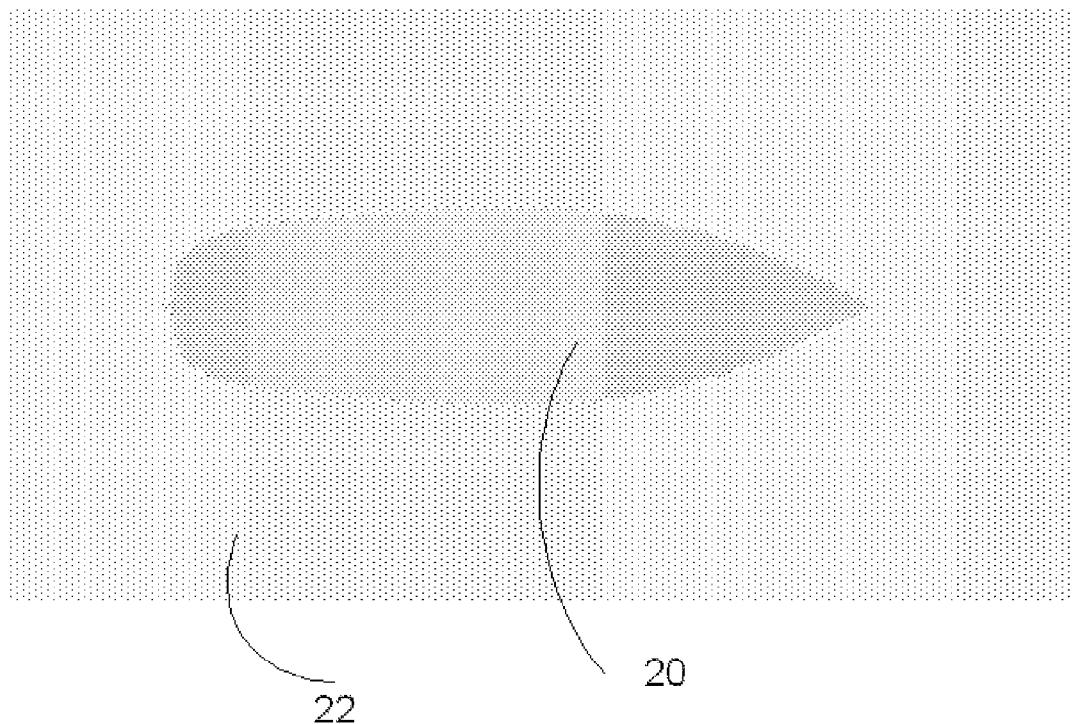
FIG. 2 shows a sketch a prior art sonar image

FIG. 2 is a sketch of a prior art representative image generated by data taken by reflection of sonar signals from the seabed and objects on the seabed. The sonar signals are sent out in this example approximately in the vertical direction, and the image formed by a visual plot of the range data (vertical coordinate) as a function of the polar coordinates. In the example shown, the resulting image would differ little from a Cartesian coordinate image using the z axis as the depth or height above the seabed, and two horizontal axis. The data are presented so that the signals from differing ranges are presented as colors, for example, or as intensities as sketched in FIG. 2 to represent the data in a black and white drawing.

Figure 3:
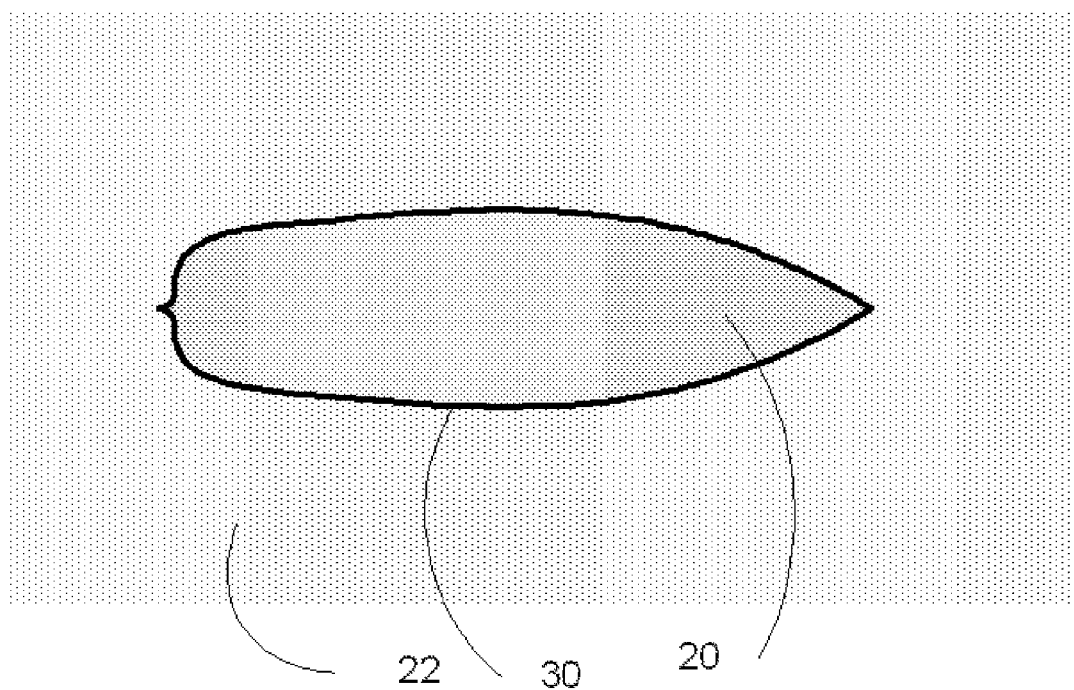
FIG. 3 shows a sketch of the data of the prior art image treated according to the method of the invention.

In the method of the invention, the sonar data are treated by calculating for each pixel the difference in range between each pixel and other pixels in the image. One method of calculation is to subtract the pixel range of a determined pixel from the range returned from a neighboring pixel. If the surface is "flat", the pixel and all its neighbors will have the same range. In the method of the invention, if the range difference is greater than a criterion, the pixel is emphasized in some way. For example, the pixel is colored differently than other pixels of the image, or the intensity of the pixel is raised (for example to the maximum intensity) or lowered to the minimum pixel intensity. The image of FIG. 3 shows such an emphasis, where the pixels on the edge are "black".

In a preferred embodiment, the difference in range for each pixel is calculated between each pixel and the following pixel in a string of pixels generated to form a line in the image. If the difference in range is greater than a determined criterion, that pixel is emphasized. In a second preferred embodiment, the difference in range is calculated between both the previous and following pixel in the string. In a third embodiment, the difference in range is calculated between the range of the pixel and the range of its 4 nearest neighbors.

In a preferred embodiment, a plane is fit to the data returned from the pixel and a number of surrounding pixels, and the range is calculated to the fitted plane. If the range differs by a criterion between that plane and planes calculated for neighboring pixels, that pixel is emphasized.

Figure 4:
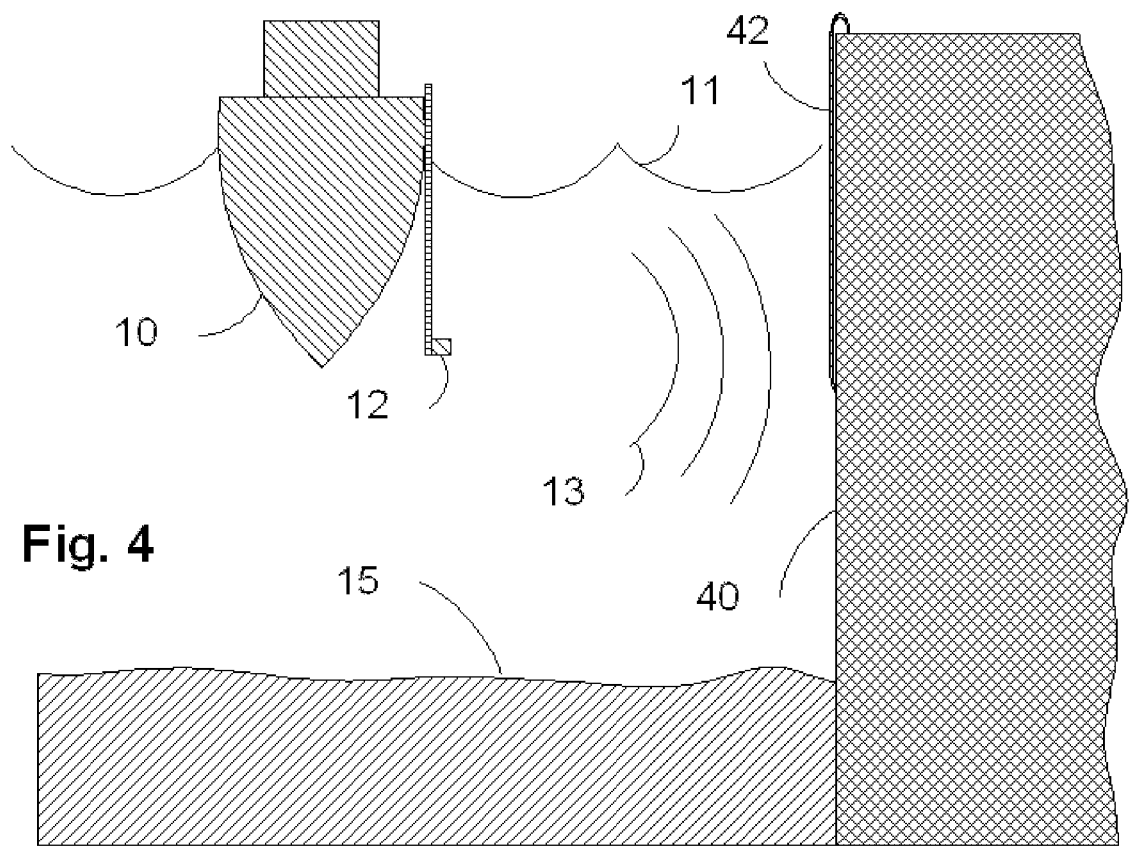
FIG. 4 shows a sketch of the method of the invention in the investigation of a vertical surface
Figure 5A:
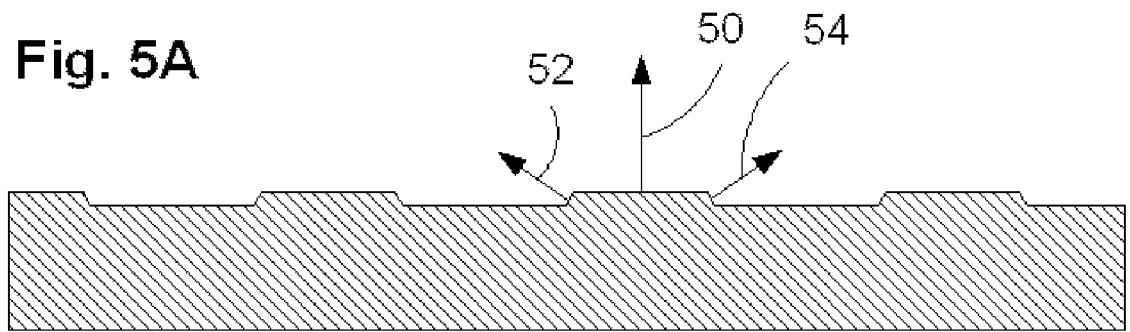
FIG. 5A shows a sketch of the cross section of a seawall
Figure 5B:
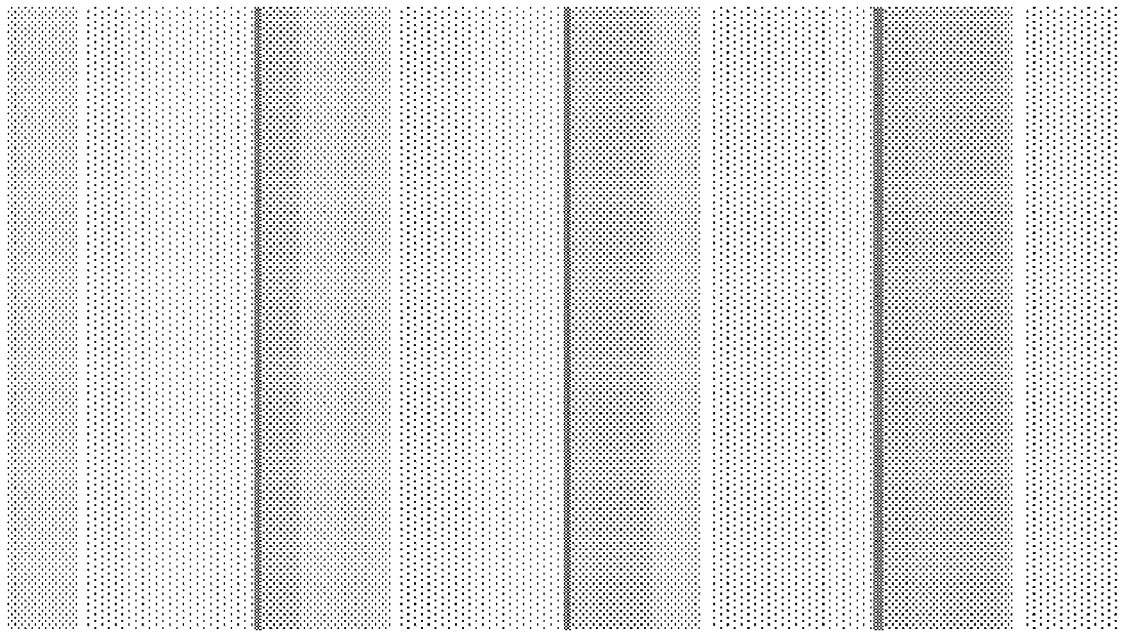
FIG. 5B shows a sketch of the image of the seawall of FIG. 5 treated according to the method of the invention.

FIG. 4 shows a sketch of a ship sending sonar signals horizontally to investigate a sea wall 40. A ladder 42 is sketched leading from above to below the water line of the sea wall. A cross sectional view of the seawall 40 is sketched in FIG. 5A. An interlocking set of metal plates is pounded into the sea bed to form the corrugated sea wall. The returned sonar data from the sea wall is treated by fitting planes to each pixel and its surrounding pixels, and calculating the normal to the planes for each pixel. FIG. 5A shows the average normal 50 calculated by averaging all the data in a large area, and the localized normals 52 and 54 calculated from "sloped" areas of the seawall. A preferred embodiment of the invention is to emphasize pixels having a normal different from the average normal by a defined criterion. In the embodiment shown in FIG. 5A, the pixels having a normal pointing in one direction to the average normal are presented with maximum intensity, and the pixels having a normal pointing in the other direction are given minimum intensity, to produce the image shown in FIG. 5B. Note that this image is similar to the image one would produce optically if light impinged on the seawall at an oblique angle, and the image was taken normally. A human observer can instantly "see" shadows and highlights from this treatment.

Figure 6:
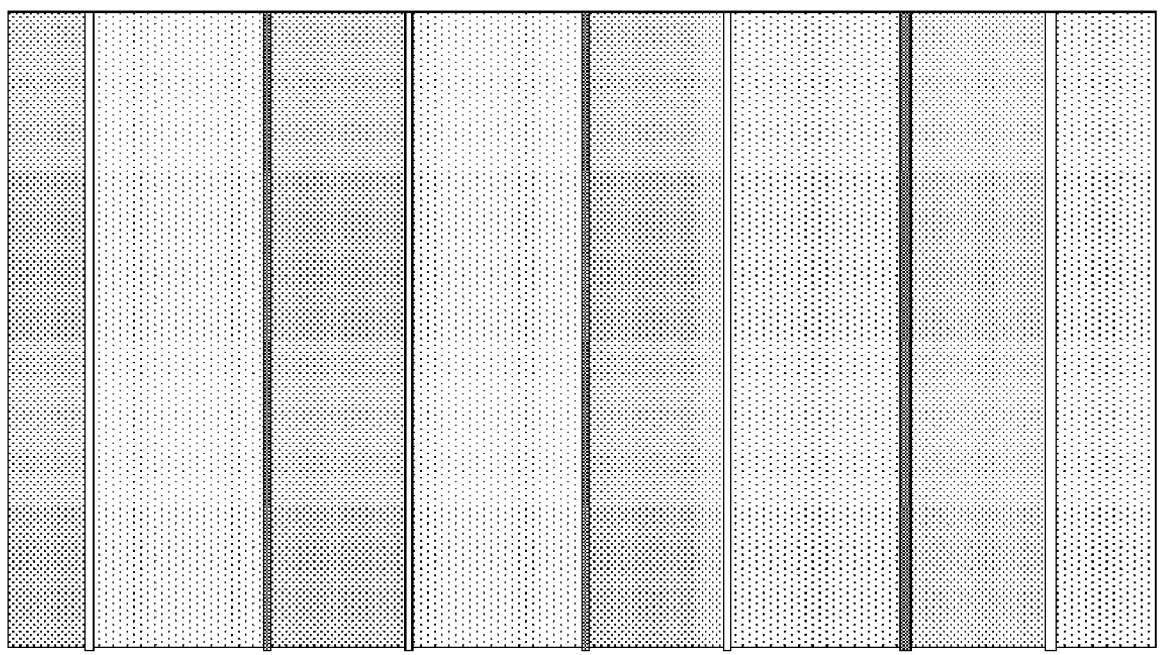
FIG. 6 shows a sketch of the image of the seawall of FIG. 5 treated according to the method of the invention.

The image is further enhanced by emphasizing pixels where the normal changes, as in FIG. 6.

Obviously, many modifications and variations of the present invention are possible in light of the above teachings. It is therefore to be understood that, within the scope of the appended claims, the invention may be practiced otherwise than as specifically described.

I claim:

1. A method of presenting sonar imaging data, comprising:
   a) receiving three dimensional sonar imaging data; then
   b) constructing a two dimensional image from the three dimensional imaging data, the two dimensional image comprising pixels arranged as an array, wherein each pixel conveys information;
   c) associating a particular change in the three dimensional imaging data with a particular pixel in the two dimensional image; then
   d) if a particular change in the three dimensional sonar imaging data is greater than a criterion, emphasizing the associated particular pixel in the two dimensional image.

2. The method of claim 1, wherein range data are presented as an image function of two polar angles, and wherein the particular change is a difference between the range coordinate of the particular pixel and the range coordinate of a pixel neighboring the particular pixel.

3. The method of claim 2, wherein for each pixel a range difference between that pixel and each of the four nearest neighboring pixels is calculated, and if any of the four range differences are greater than a criterion, that pixel is emphasized.

4. The method of claim 2, wherein for each pixel the range difference between that pixel and each of the two neighboring pixels in a direction of one of the two polar coordinates is calculated, and if either of the two range differences are greater than a criterion, that pixel is emphasized.

5. The method of claim 1, wherein for each pixel a plane is fit to the three dimensional coordinates of each pixel in the image, and wherein the normal to the plane is calculated, and wherein the pixel is emphasized if the normal to the plane satisfies a criterion.

6. The method of claim 1, wherein the particular changes are changes in a depth coordinate in a Cartesian three dimensional image.

7. The method of claim 1, wherein the particular changes are changes in a horizontal coordinate in a Cartesian three dimensional image.

8. The method of claim 1, wherein the three dimensional sonar imaging data is taken in a single ping.

9. The method of claim 1, wherein the three dimensional sonar imaging data are taken in a plurality of pings.

10. A method of presenting sonar imaging data, comprising:
   a) receiving three dimensional sonar imaging data; then
   b) constructing a two dimensional image from the three dimensional imaging data, the two dimensional image comprising pixels arranged as an array, wherein each pixel conveys information, wherein the two dimensional image comprises an image in a Cartesian coordinate system having a first and a second horizontal axis and a vertical axis,
   c) associating a particular change in the three dimensional imaging data with a particular pixel in the two dimensional image; then
   d) if a particular change in the three dimensional sonar imaging data is greater than a criterion, emphasizing the associated particular pixels in the two dimensional image.

11. The method of claim 10, wherein the particular changes are changes in the first horizontal coordinate, and wherein the first horizontal coordinate data are presented as an image function of the second horizontal coordinate and the vertical coordinate.

12. The method of claim 11, wherein for each pixel a difference in the first horizontal coordinate between that pixel and each of the four neighboring pixels is calculated, and if any of the four differences are greater than a criterion, that pixel is emphasized.

13. The method of claim 11, wherein for each pixel a difference in the first horizontal coordinate between that pixel and each of the two neighboring pixels in a direction of either the second coordinate axis or the vertical coordinate axis is calculated, and if either of the two range differences are greater than a criterion, that pixel is emphasized.

14. The method of claim 11, wherein for each pixel a plane is fit to the coordinates of each pixel and its surrounding pixels in the image, and wherein the normal to the plane is calculated, and wherein the pixel is emphasized if the normal to the plane satisfies a criterion.

15. The method of claim 10, wherein the particular changes are changes in the vertical coordinate, and wherein the vertical coordinate data are presented as an image function of the first and second horizontal coordinates.

16. The method of claim 10, wherein the three dimensional sonar imaging data is taken in a single ping.

17. The method of claim 10, wherein the three dimensional sonar imaging data are taken in a plurality of pings.

18. A method of presenting sonar imaging data, comprising:
   a) projecting a sound wave into a sound wave transmitting medium;
   b) receiving sound waves reflected from one or more objects in the sound wave transmitting medium, each of the one or more objects having a defined three dimensional location in the in the sound wave transmitting medium;
   c) transforming the reflected sound waves into electrical signals, the electrical signals comprising the sonar imaging data;
   d) analyzing the electrical signals to record at least the three dimensional locations of the one or more objects, wherein in the electrical signals are analyzed by a processor
   e) constructing a two dimensional image from the three dimensional imaging data, the two dimensional image comprising pixels arranged as an array, wherein each pixel conveys information;
   f) associating a particular change in the three dimensional imaging data with a particular pixel in the two dimensional image; then
   g) if a particular change in the three dimensional sonar imaging data is greater than a criterion, emphasizing the associated particular pixel in the two dimensional image.

19. The method of claim 18, wherein the two dimensional image is displayed on a display device.

* * * * *